United States Patent [19]

Leitl

[11] 4,432,647
[45] Feb. 21, 1984

[54] DEVICE FOR MEASURING ROTATION RATES

[75] Inventor: Franz Leitl, Korntal, Fed. Rep. of Germany

[73] Assignee: International Standard Electric Corporation, New York, N.Y.

[21] Appl. No.: 427,844

[22] Filed: Sep. 29, 1982

Related U.S. Application Data

[63] Continuation of Ser. No. 143,825, Apr. 25, 1980, abandoned.

[30] Foreign Application Priority Data

Apr. 28, 1979 [DE] Fed. Rep. of Germany ....... 2917442

[51] Int. Cl.³ ............................................. G01B 9/02
[52] U.S. Cl. ................................................. 356/350
[58] Field of Search ............................... 356/349-350; 250/550; 455/619; 328/144, 154

[56] References Cited

U.S. PATENT DOCUMENTS

| | | | |
|---|---|---|---|
| 3,363,104 | 1/1968 | Waite et al. | 455/619 |
| 4,133,612 | 1/1979 | Redman | 356/350 |
| 4,152,072 | 5/1979 | Hutchings | 356/350 |
| 4,156,135 | 5/1979 | Miller, Jr. et al. | 378/154 |
| 4,272,193 | 6/1981 | Eastman et al. | 356/349 |

OTHER PUBLICATIONS

Arditty et al., "Re-entrant Fiberoptic Approach to Rotation Sensing", SPIE vol. 157, 1978, pp. 138-148.
Martin et al., "Fiber Optic Laser Gyro Signal Detection & Processing Technique", SPIE vol. 139, *Guided Wave Optical Systems & Devices*, 1978, pp. 98-102.

*Primary Examiner*—William H. Punter
*Attorney, Agent, or Firm*—T. E. Kristofferson; O'Neil W. T.

[57] ABSTRACT

Light pulses periodically produced by a light source are each split into two pulses by an optical splitter and so introduced into a closed optical optical-fiber loop having at least one turn that they travel through the optical-fiber loop in opposite directions. After each circulation, a part of the pulses is extracted and fed to at least two adjacent optical/electrical transducers.

The position of the interference pattern obtained by heterodyning is so controlled that an extreme value of the intensity distribution is present at the line of contact of the optical/electrical transducers. From the output signals of the optical/electrical transducers, a sum signal and a difference signal are formed. The sum signals are used to eliminate the amplitude dependence of the different signals. The rotation rate is determined from the difference between the difference signals assigned to two successive circulations around the optical-fiber loop.

4 Claims, 8 Drawing Figures

DEVICE FOR MEASURING ROTATION RATES

This is a continuation of application Ser. No. 143,825, filed Apr. 25, 1980 and now abandoned.

FIELD OF THE INVENTION

The present invention relates to a device for measuring rotation rates.

PRIOR ART

The most pertinent prior art in mechanical rotation rate measurement is disclosed in German Offenlegungsschrift (DE-OS) No. 2538287. Devices relying on the Sagnac effect are known, but the actual measurement instrumentation is usually of the static type, inherently subject to errors. The manner in which the present invention provides improved measurement instrumentation will be understood as this description proceeds. The nature of certain elements of the novel combination is defined by alluding to certain references identified hereinafter.

SUMMARY

The general object of the invention is to provide a device whereby a rotation rate can be safely determined from two component beams heterodyned together after travelling through an optical fiber loop in opposite directions.

This object is achieved by the means set forth in claim 1. Further developments are apparent from the subclaims.

The novel evaluating technique can be implemented in a simple manner. Since pulsed signals are used, each of the heterodyned signals can be assigned to a given circulation. To determine the rotation rate, a.c. voltages of known frequency (e.g., 100 kHz) are evaluated, which can be done over a wide dynamic range and with high accuracy. The evaluation is so fast that it will not be invalidated by the slow disturbances caused by effects on the light propagation in the optical fiber. Through the periodic evaluation, the influence of thermal "fiber noise" is greatly reduced.

BRIEF DESCRIPTION OF THE DRAWINGS

The invention will now be explained in more detail, by way of example, with reference to the accompanying drawings, in which.

DETAILED DESCRIPTION

Figure 1:
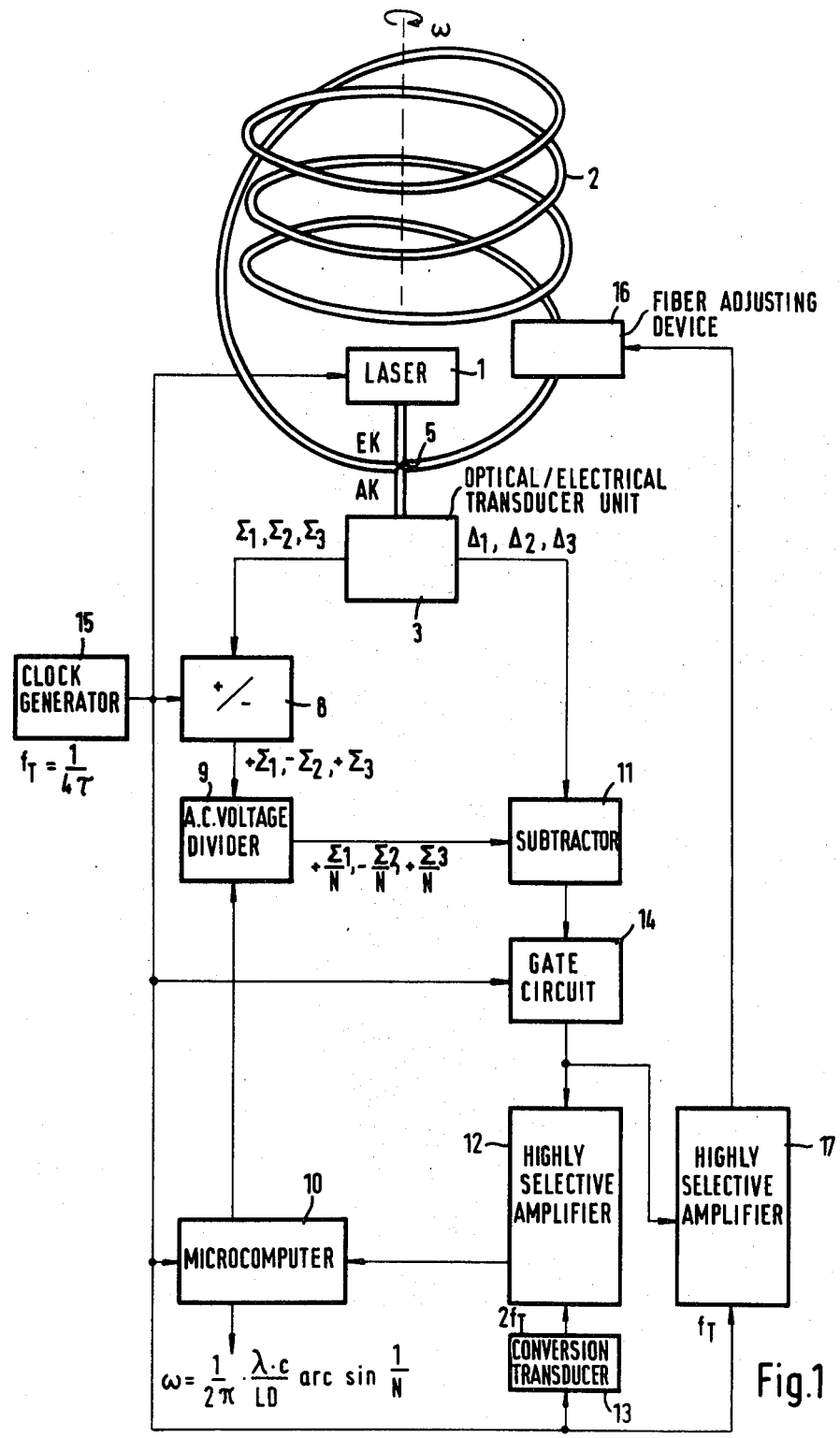
FIG. 1 is a block diagram of the device for measuring rotation rates.

At the outset, the design of the device for measuring rotation rates will be described with the aid of FIG. 1. Light pulses produced in a laser 1 are passed to an optical splitter 5, which splits each light pulse into two light pulses of the same amplitude. These two light pulses travel through an optical-fiber coil 2 in opposite directions. The coiled loop has one or more circular turns. Having travelled through the loop in opposite directions, the two light pulses return to the optical splitter 5, which now extracts a given part of each of the two light pulses and passes this part to an optical/electrical transducer unit 3, while allowing the remainder to pass into the loop for the next circulation. This repeats itself several times.

The optical splitter is typically formed by four optical-fiber ends; two of them belong to the loop, one to an optical fiber running to the laser 1, and one to an optical fiber transferring the extracted pulses to the optical/electrical transducer unit 3. The four ends of the optical fibers are ground at an angle of 45°; they are partially reflecting and abut on each other at their areas of cut. The optical splitter may also be designed as a thin-film integrated optical system.

The optical splitter allows a given part of the light energy of each pulse produced by the laser to pass directly to the optical/electrical transducer unit. As a refinement, the corresponding electrical output signal of the transducer can be used to control the laser so that it provides pulses having a constant amplitude. This refinement is not specifically shown in FIG. 1.

The pulses extracted by the optical splitter 5 beat together and are passed to the optical/electrical transducer unit 3. The transducer unit 3 contains two optical/electrical transducers 21, 22 arranged side by side, and will be explained in more detail with the aid of FIG. 8. The output signals of these optical/electrical transducers 21 and 22 are applied to devices 6 and 7 in the transducer unit 3, which form, respectively, the sum $\Sigma$ and the difference $\Delta$ of these signals.

The sum signal is fed to a device 8, which alternates the polarity of the sum signal under control of a clock generator 15. The controllable a.c. voltage divider 9 has its division ratio controlled by a microcomputer 10, which is also provided with clock pulses from the clock generator 15. The output signals of the controllable a.c. voltage divider 9 and the $\Delta$-signals from transducer unit 3 are applied to a subtractor 11, the function of alternate optic fiber loop light pass averaging being thereby implemented. The significance and operation of these elements will be better understood as this description proceeds.

Of the signal obtained by this subtraction, only that part is passed by a gate circuit 14 and applied to a first highly selective amplifier 12, containing a coherent detector, which is assigned to two successive pulses. The gate circuit 14 is controlled by the clock generator 15. The output signal of the highly selective amplifier 12 is fed to the microcomputer 10.

The clock generator 15 also controls the instant of emission of the laser pulses, the first highly selective amplifier 12, and a second highly selective amplifier 17, which also contains a coherent detector and is also fed with the output signal of the gate circuit 14. Before the clock signal is applied to the first amplifier 12, however, its frequency $f_T$ is doubled to $2f_T$. Instead of doubling the frequency, it also possible to generate the frequency $2f_T$ in a clock generator and derive the frequency $f_T$ therefrom by means of a divider.

The second amplifier 17 controls a fiber adjusting device 16. The fiber adjusting device produces different changes in effective path length for the light pulses travelling through the optical fiber in opposite directions. This can be done by influencing the birefringence effects in the optical fiber, preferably thermally, magnetically or electrostatically. Thermal influence can be exerted by surrounding a given part of the optical fiber with heating wires.

The individual components used will not be explained here; they are generally known. The selective amplifier may be of the kind commonly used in radio receivers. Coherent detectors are described in a book by J. H. Roberts, "Angle modulation, the theory of system assessment", published by Peter Peregrinus Ltd., England, 1977, particularly in chapter 10.6. The optical and electrooptic components used are described in an article by T. A. Eppes, "Optical-Fiber Transmission Links", Electronic Design 23, Nov. 8, 1977, on pages 64–71.

The operation of the measuring device of FIG. 1 will now be explained in greater detail with the aid of FIGS. 2 to 8.

Figure 2:
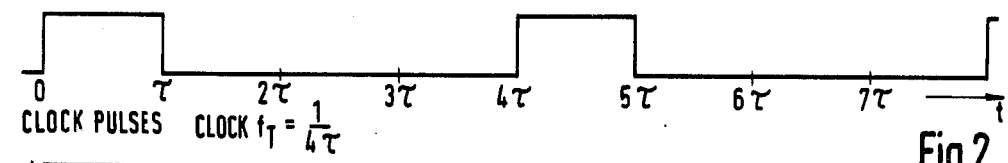
FIG. 2 shows the clock pulses used to control the laser and the evaluation.

FIG. 2 shows the clock pulses provided by the clock generator 15. They have the frequency $f_T = 1/4\tau$ and a length $\tau$, with $\tau = L/V$, L=length of the optical fiber between the point of introduction EK and the point of extraction AK, and V=velocity of light in the fiber. For the first amplifier 12, these clock pulses are converted in a conversion transducer 13 to clock pulses having the frequency $2f_T$.

As stated earlier, during the time from 0 to $\tau$, the laser produces a light pulse which is split into two light pulses by the optical splitter 5. These light pulses travel through the optical fiber 2 in opposite directions. The distance between the laser and the optical splitter can be chosen to be so small that the time taken from the laser pulse to traverse this path is negligible. In addition, this transit time does not directly affect the measurement of the rotation rate, because it is not influenced by the rotation.

Thus, two light pulses issue from the optical splitter during the time from 0 to $\tau$. When the measuring device is at rest, the leading edges of the light pulses return to the optical splitter after their transit time $\tau$ through the optical fiber, and these light pulses (strictly speaking, a part of each of them) remain at the optical splitter up to the instant $2\tau$. Thereafter, the leading edges of the light pulses already arrive at the optical splitter after the second circulation.

Figure 3:
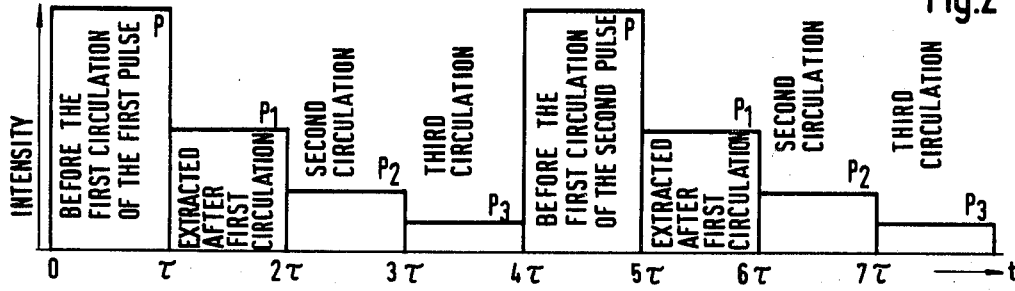
FIG. 3 shows the amplitude dependence of the light pulses on the number of circulations and on the attenuation in the optical fiber.

The amplitudes change from circulation to circulation, not only because of their attenuation in the optical fiber but also because a given part is extracted after each circulation. These extracted pulses have an intensity P1 after the first circulation, an intensity P2 after the second circulation, etc. (FIG. 3).

When the measuring device is at rest, the extracted pulses arrive at the optical splitter simultaneously provided that perturbations during propagation in the optical fiber are neglected. During rotation, the transit time of one of the light pulses is slightly lengthened, while that of the other is correspondingly shortened (Sagnac effect). When the pulses extracted from the light pulses are heterodyned together, the carrier waves of the extracted pulses are shifted in phase with respect to each other, so that interference patterns depending on the rotation rate and the geometrical configuration of the optical splitter and the optical/electrical transducers are produced on the surfaces of the optical/electrical transducers. The shift of the fringes of the interference pattern is proportional to the rotation rate and can be directly evaluated (static evaluation). The device necessary for this may be similar to that described with the aid of FIG. 1.

Figure 4:
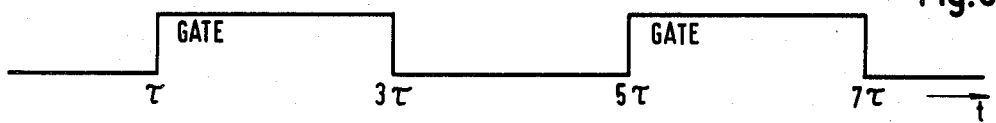
FIG. 4 shows gating pulses for eliminating signals not assigned to two successive circulations.

It is particularly advantageous, however, to perform a dynamic evaluation instead of the static one. Dynamic evaluation is possible because the light pulses travel through the optical fiber several times, with the phase shift between the carrier waves of the light pulses increasing by the same amount after each circulation. The phase shifts after one, two, and three circulations are $\phi_1$, $\phi_2$, and $\phi_3$, respectively. In the present example, the difference between the phase shifts assigned to the first and second circulations—i.e., $\Delta\phi = \phi_2 - \phi_1$—is evaluated. Hence, $\Delta\phi = \phi_1$. Only the extracted pulses assigned to the first and second circulations are to be evaluated. Therefore, the gate circuit 14 is provided, which passes only the extracted pulses assigned to these circulations. It passes signals only during the times $\tau$ to $3\tau$, $5\tau$, to $7\tau$, etc. The time assignment of the gates to the extracted pulses and the clock pulses is shown in FIGS. 2 to 4.

Figure 8:
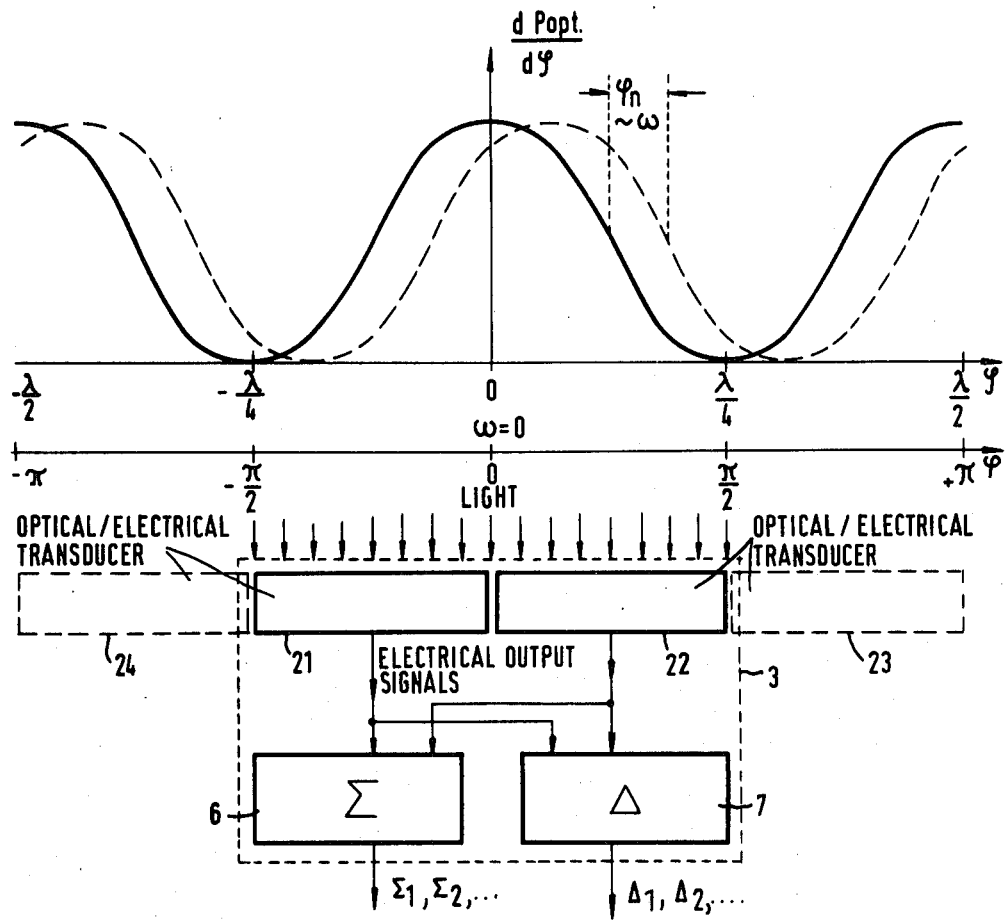
FIG. 8 shows the distribution of light intensity on the optical/electrical transducers.

Particularly advantageous evaluation can be performed if the optical/electrical transducer unit is designed as shown in FIG. 8.

In the upper part of FIG. 8, the intensity distribution $dP_{opt}/d\delta$ is plotted as a function of the dimension $\delta$ on the surfaces of the optical/electrical transducers 21, 22. It follows from the heterodyning of the two pulses which are extracted by the optical splitter after each circulation. The intensity distribution—i.e., the interference pattern—on the optical/electrical transducers 21, 22 shifts as a function of the rotation rate $\omega$. This gives the above-mentioned fringe shift $\phi_n$, which can be evaluated. The intensity distribution is periodic. A period has the length $\lambda/2$, where $\lambda$ is the light wavelength.

In the quiescent condition, the fringe positions—i.e., the positions of the maxima and minima—are dependent on the difference in optical paths. By changing this difference, the positions of the extrema can thus be adjusted. This is done with the fiber adjusting element 16.

In the described embodiment, a maximum of the intensity distribution is placed at or near the line of contact of the two optical/electrical transducers 21, 22. Particularly advantageously, a maximum or minimum of the intensity distribution is at the line of contact, for the fringe shift to be evaluated is then symmetric about the line of contact.

The geometric fringe shift is $\Delta Z = \Delta\delta/\lambda$, and it is convertible into the phase shift using the equation $\phi_n = 2\pi\Delta\delta/\lambda$. The $\phi$-axis below the $\delta$-axis in FIG. 8 shows the phase shift.

Due to the rotation at the rate $\omega$, the dashed curve of the intensity distribution is shifted relative to the solid curve by $\phi_n$. For example, $\phi_n = \phi_2 - \phi_1 = \Delta\phi$. If the solid curve is the intensity distribution for the heterodyned extracted pulses assigned to the second circulation of the light pulses around the optical fiber, then the dashed curve is the intensity distribution for the heterodyned extracted pulses assigned to the third circulation. If the rotation rate has a different directional sense, the intensity distribution will be shifted in the negative direction. The heterodyned extracted pulses are so imaged on the two optical/electrical transducers 21, 22 by means of an optical imaging device (not shown) that each of them is illuminated by a range having the extension $\lambda/4$.

From the two electrical output signals of the optical/electrical transducers, the sum $\Sigma$ and the difference $\Delta$ are formed in devices 6 and 7, respectively (FIG. 8). For the pulses extracted after the 1st, 2nd, and 3rd circulations, the signals $\Sigma_1$, $\Sigma_2$ and $\Upsilon_3$, respectively, and $\Delta_1$, $\Delta_2$, and $\Delta_3$, respectively, are obtained.

With the above assumptions, one obtains:

$$\Sigma = \frac{1}{2} \cdot \frac{e}{\nu} \cdot P_{opt.} = A \qquad (1)$$

$$\Delta = \frac{1}{2} \cdot \frac{e}{\nu} \cdot P_{opt.} \cdot \sin\left(4\pi \frac{\phi'n}{\lambda}\right) = A \cdot \sin\phi, \qquad (2)$$

with $\phi = 4\pi \frac{\phi'n}{\lambda}$, where
- $\eta$ = quantum efficiency of the optical/electrical transducers
- e = elementary charge
- h = Plank's constant
- $\nu$ = light frequency
- $P_{opt.}$ = light intensity If the arrangement is expanded by adding identical optical/electrical transducers 24, 23 to the optical/electrical transducers 21, 22 on the left- and right-hand sides, and all electrical output signals are converted back into $\Delta$- and $\Sigma$-signals, the factor $\frac{1}{2}$ in the equations (1) and (2) must be omitted. Thus, better efficiency is obtained. The optical image is then formed so that a range with a total extension $\lambda$ is illuminated.

From equations (1) and (2) it can be seen that the only variable contained in the $\Sigma$-signal is the intensity of the incident light, which varies from circulation to circulation. The $\Delta$-signal contains another variable, the angle $\Delta\phi$, which is proportional to the rotation rate. With the aid of the $\Sigma$-signal it is thus possible to eliminate the dependence of the $\Delta$-signal on attenuation and decrease in amplitude, which dependence varies from circulation to circulation, and the angle $\Delta\phi$ is obtained directly.

As stated earlier, however, the phase shift is not measured statically after each circulation, but the difference between the phase shifts assigned to successive circulations is evaluated. For three circulations as assumed hereinabove, the phase shifts are:

1st circulation $\phi_1 = 4\pi \cdot \frac{\phi'_1}{\lambda}$

2nd circulation $\phi_2 = 4\pi \cdot \frac{\phi'_2}{\lambda}$

3rd circulation $\phi_3 = 4\pi \cdot \frac{\phi'_3}{\lambda}$

The following relations hold: $\phi_2 - \phi_1 = \Delta\phi$; $\phi_3 - \phi_2 = \Delta\phi$; $\phi_1 = \Delta\phi$ $\phi_2 - \phi_1 = \Delta\phi$ is to be evaluated. If several phase differences are evaluated, these can be used for control checks or to average the measurement result.

The following description will be given with the aid of FIGS. 4 to 7. As mentioned above, the gate circuit 14 passes only those output signals of the subtractor for further processing which are assigned to the first and second circulations.

Figure 5:
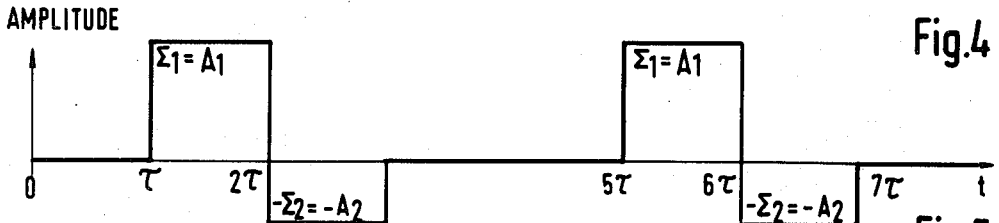
FIGS. 5–7 show the signals occurring during evaluation.
Figure 6:
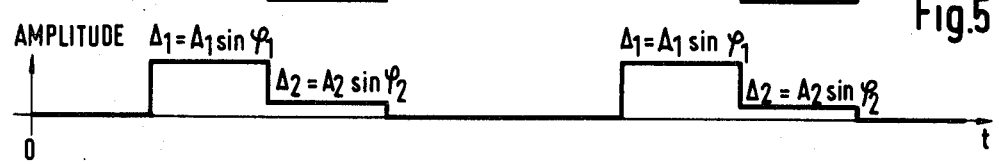
Figure 7:
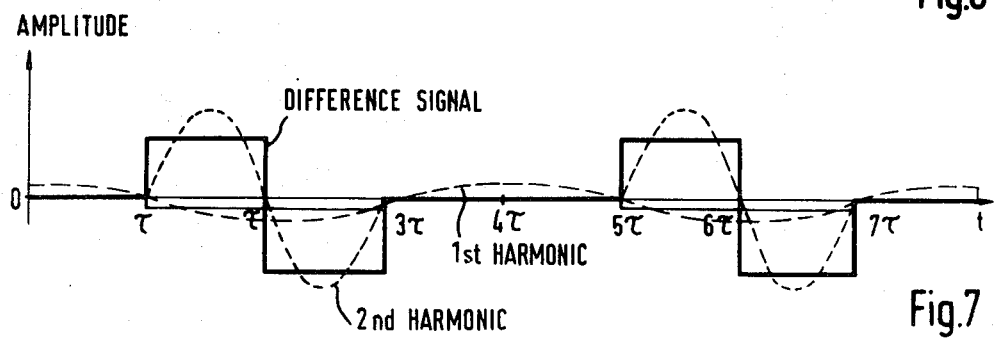

For clarity, only those $\Sigma$-signals and $\Delta$-signals are shown in FIGS. 5 and 6, respectively, which are passed by the gate circuit following subtraction in the subtractor 11. The subtractor 11 forms the differences between $\Sigma_1$ and $\Delta_1$ and between $\Sigma_2$ and $\Delta_2$. The signal so obtained is shown in FIG. 7 (heavy continuous line). The average of this signal is shown by the thin continuous line.

The first highly selective amplifier 12 passes only the first harmonic of this signal, having the frequency $f_T = 1/4\tau$, while the second highly selective amplifier 17 passes only the second harmonic, having the frequency $2f_T = 1/2\tau$. The sign of the coherently detected output signal of the first amplifier 12 gives the directional sense of the rotation rate; the magnitude of this signal represents the magnitude of the rotational velocity. The output signal of the second amplifier is used to control the fiber adjusting device 16 so that the intensity distribution on the optical/electrical transducers has the characteristic explained with the aid of FIG. 8.

If the maximum of the intensity distribution lies on the line of contact of the optical/electrical transducers, then the amplitude of the output signal of the second amplifier 17 is zero.

Simultaneously with this control, the output signal of the first amplifier 12 can advantageously be made zero, too. This is accomplished by changing the division ratio of the controllable a.c. voltage divider 9 by means of the microcomputer 10. In the balanced condition, i.e., when the amplitude of the $\Sigma$-signal was so reduced by division that the amplitude of the output of the second amplifier 12 is zero, the division ratio is proportional to the rotation rate $\omega$. The following equation holds:

$$\omega = \frac{1}{2\pi} \cdot \frac{\lambda C}{LD} \text{ arc sin} \frac{1}{N},$$

where C = velocity of light in vacuo.

Compared with the time required for the measurement, any change in rotation rate takes place so slowly that sufficient time is available for the control.

Because of the continuous control and the periodic difference measurement, zero drift (caused by interference effects) of the reference values is avoided during evaluation. Furthermore, the effect of "fiber noise" is reduced.

In the microcomputer 10, the rotational velocity can be integrated over time. The direction of the rotational velocity is given by the sign of the output signal of the first amplifier 12. Besides providing the rotational velocity, the microcomputer can thus also specify the respective angle of rotation.

I claim:

1. Apparatus for measuring the rotation rate of a rotating mechanical member about an axis, comprising:
   a source of pulsed light energy;
   first means including a continuous optical fiber having at least one loop coiled generally about said axis and mounted to rotate about said axis with said mechanical member;
   second means comprising an optical splitter responsive to said source and operatively associated with said optical fiber at both ends thereof to cause said light energy to propagate in both directions in said optical fiber, said splitter also being operative to heterodyne light energy emerging from said optical fiber ends to generate optical output signals including said heterodyned light energy;
   third means responsive to said second means for converting said optical signal output signals to electrical output signals, said third means comprising at least two optical-to-electric signal transducers arranged in juxtaposition and both responsive to said second means light output;

fourth means synchronous with the pulsing of said light energy source for selecting and passing said third means electrical output signals after said light energy has passed through said optical fiber more than once;

fifth means responsive to said fourth means for evaluating the phase shift between the phases of said second means optical output signals as represented by the corresponding electrical signals at said third means output and corresponding to at least two successive circulations of said pulsed light through said optical fiber to derive a signal which is representative of said rate of rotation;

sixth means comprising summing and differencing circuits responsive to the outputs of said third means transducers for deriving signals representative of the sum and difference of said third means outputs;

and seventh means responsive to said sixth means output signals for adjusting the amplitude of said difference signals as a function of the amplitude of said sum signal for each value of said difference signal corresponding to a discrete circulation of said light energy through said optical fiber.

2. Apparatus according to claim 1 in which eighth means are included in series with said optical fiber for controlling the transit time difference between pulses of said light energy traveling in opposite directions in said optical fiber such that the intensity distribution has one of two values consisting of a maximum and a minimum substantially at the apertures of said transducers.

3. Apparatus according to claim 1 in which said source of pulsed light energy is defined as producing pulses of duration not greater than the time between introduction of said pulses into said optical fiber and extraction of said pulses therefrom.

4. Apparatus according to claim 3 including ninth means responsive to said sum signals from said sixth means for alternating the polarity of successive circulation pulses in electric signal form and for supplying the resulting alternating polarity signals to said seventh means.

* * * * *